Patented Aug. 14, 1945

2,382,498

UNITED STATES PATENT OFFICE 2,382,498

ELECTRICAL INSULATING MATERIAL

John Frederick Morley, London W. C. 2, England, assignor to International Standard Electric Corporation, New York, N. Y.

No Drawing. Application July 10, 1940, Serial No. 344,731. In Great Britain July 25, 1939

4 Claims. (Cl. 260—4)

This invention relates to electrical insulating materials and particularly insulating materials for use in connection with cables and other conductors.

It has been appreciated for some years that polymerised aromatic vinyl hydrocarbon compounds such as polymerised vinyl benzene (polystyrene) have extremely desirable electrical characteristics, e. g., an extremely low power factor. On the other hand, it sometimes happens that an insulating material is required having a greater toughness and flexibility than that of polystyrene, and, therefore, attempts have been made to produce a tough and flexible composition containing polystyrene and having electrical characteristics not greatly inferior to pure polystyrene. In this connection British Patent No. 357,624 describes an insulating material comprising pure rubber admixed with between 40% and 80% of a synthetic hydrocarbon polymer, e. g., polystyrene, and up to 20% by weight of an additional substance such as hydrocarbon wax.

In my U. S. Patent No. 2,282,002 I point out that polymerised aliphatic mono-olefines having less than six carbon atoms and especially polymerised isobutylene have superior electrical characteristics to rubber and at the same time provide physical properties closely analogous thereto. That is to say, the toughness and flexibility of polymerised iso-butylene closely resembles rubber whilst its electrical properties are superior.

According to my Patent No. 2,282,002 there is therefore provided a method of preparing an insulating material which comprises either adding in polymerised form an aliphatic mono-olefine having less than six carbon atoms to a mononuclear aromatic vinyl hydrocarbon when in monomeric or partially polymerised form, allowing the aliphatic mono-olefine to dissolve or swell in the aromatic compound and then subjecting the mixture to the action of heat in order to polymerise the aromatic compound, or dissolving a polymerised aliphatic mono-olefine having less than six carbon atoms and a polymerised mononuclear aromatic vinyl hydrocarbon compound in a common solvent, forming a substantially homogeneous solution and thereafter heating the solution in order to drive off the solvent.

According to my Patent No. 2,282,002 the insulating material may have incorporated therein up to 25% of rubber, balata or gutta percha but recent experiments have shown that it is not very satisfactory to attempt to dissolve both a member of the rubber group and a polymerised aliphatic mono-olefine compound in styrene in that the rubber or the like passes much more quickly into solution (in, e. g., half an hour), while the polymerised aliphatic compound even when dissolved by itself in pure styrene takes a considerable time. The resulting compound only polymerises very slowly whereas without the polymerised aliphatic mono-olefine polymerisation is much more rapid. As a result of recent experiments I have, however, discovered that if a rubber and polystyrene or similar composition be produced then the plasticising effect of the rubber permits the polymerised aliphatic compound to be milled into the composition. It should in this connection be remembered that an attempt to mill together pure polystyrene and a polymerised aliphatic compound produces nothing that is of any practical use in that a homogeneous product cannot, in my experience, be obtained.

According to the present invention, therefore, I provide a method of manufacturing an insulating material which comprises swelling a member of the rubber group in a liquid polymerisable mononuclear aromatic vinyl hydrocarbon compound, thoroughly mixing the composition in order to make it homogeneous, then heating the composition in order to polymerise the aromatic compound and finally milling the composition with a polymerised aliphatic mono-olefine having less than six carbon atoms in order to produce a homogeneous insulating material.

More specifically the invention comprises swelling a member of the rubber group in monomeric or partially polymerised styrene to form a composition containing between 10% and 30% of rubber, thoroughly mixing the composition in order to make it homogeneous, then heating the composition in order to polymerise the styrene and finally milling polyethylene or polyisobutylene into the composition in order to produce a homogeneous insulating material.

It may be here mentioned that the original polystyrene rubber mixture should preferably contain about 20% rubber in that if considerably less rubber be present it becomes rather difficult to work on the mill and it is not easy to add the aliphatic compound, while if considerably more rubber be used the polymerisation becomes slower and this takes considerable time in any case as will be appreciated from the above description. The 20% of rubber is therefore a good compromise.

Additional substances may be incorporated within the insulating material, e. g., waxes, mineral fillers and the like.

Insulating material according to the invention is very suitable for the insulation of high frequency electric cables, e. g., air space cables in which case the material may be formed into discs, rods, tubes, tapes, star shaped members and so on.

In order that the method of manufacture according to the invention may be more clearly understood, reference will now be made to one or two examples, viz:

Example 1

1100 grammes of crepe rubber are swollen in 5000 ccs. of pure monomeric styrene (i. e., approximately 20% rubber to 80% styrene by weight). The mixture is then thoroughly mixed in an ordinary rubber dough mixer provided with strong blades. The mixture is then placed in a metal, e. g., tin container which fits into an iron vacuum vessel which is evacuated and then placed into an oil bath at 80° C. for five days and at 100° C. for three days, in order to effect polymerisation of the styrene. The vacuum vessel is then opened and the container removed and allowed to cool after which, when the rubber-polystyrene mix is thoroughly cold, the tin container is ripped away, leaving the rubber-polystyrene mix in the form of a block.

It may be mentioned that the method of sealing the container in the vacuum vessel is rather important otherwise the styrene may distil into the space between the container and the inner wall of the vacuum vessel. In order to afford a satisfactory seal the vacuum vessel may be provided with a lid having an annular recess in the lower face thereof into which the walls of the container may project when in position, the recess being first filled with a quick vulcanising rubber in the unvulcanised condition. The seal starts off as a putty type of seal but rapidly changes to a normal rubber washer type of seal as vulcanisation proceeds. The lid of the vacuum vessel may be sealed to the body thereof in any convenient manner.

The rubber-polystyrene mix produced as above is next cut into small pieces and placed in an oven at 120° C. for about a quarter of an hour, then milled in as short a space of time as possible, and sheeted out thinly with the rolls running hot. With the rolls still hot 35 parts of a polymerised aliphatic compound as specified, e. g., polyisobutylene, are placed in the mill to which is added 100 parts of the rubber-polystyrene mix. Milling is carried on until the composition becomes substantially homogeneous.

Example 2

A rubber-polystyrene mix is produced as described above and 100 parts of this mix are milled together with 35 parts of a mixture consisting of a polymerised aliphatic olefine as specified, e. g., polyisobutylene (100 parts), crepe rubber (50 parts) and paraffin wax (25 parts).

Example 3

A rubber-polystyrene mix is provided by the method described above and 100 parts of the rubber-polystyrene mix is milled together with 55 parts of a mixture consisting of a polymerised aliphatic olefine of high molecular weight (100 parts), crepe rubber (50 parts) and a polymerised aliphatic olefine of low molecular weight (16 parts).

The insulating material produced in accordance with Example 2 may be employed in producing the ribs of a spacer as described in British Patent No. 526,959 while the insulating material produced in accordance with Example 3 may form the inner sheath thereof.

What is claimed is:

1. The method of preparing a homogeneous mixture containing a polymerized mono-olefine and a polymerized mono-nuclear aromatic vinyl hydrocarbon compound, which comprises swelling rubber in liquid polymerizable styrene to form a millable solid composition containing between 10% and 30% of rubber, mixing the composition in order to make it homogeneous and then heating the composition to polymerize the styrene, and then milling polymerized mono-olefine into the composition.

2. The method according to claim 1, in which the mono-olefine is isobutylene.

3. The method according to claim 1, in which the mono-olefine is ethylene.

4. The method of preparing a homogeneous mixture containing a polymerized mono-olefine having less than six carbon atoms and polystyrene, which comprises swelling rubber in monomeric styrene to form a millable solid composition containing between 10% and 30% of rubber, mixing the composition until it is homogeneous, heating the composition to polymerize the styrene, and then milling the polymerized mono-olefine into the composition.

JOHN FREDERICK MORLEY.